US005206954A

United States Patent [19]

Inoue et al.

[11] Patent Number: 5,206,954

[45] Date of Patent: Apr. 27, 1993

[54] SATELLITE SIGNAL RECEIVING APPARATUS

[75] Inventors: Nobutaka Inoue, Aichi; Hiroshi Matsubara, Owariasahi; Masaaki Nagase, Toyoake, all of Japan

[73] Assignee: Masprodenkoh Kabushikiaisha, Japan

[21] Appl. No.: 766,195

[22] Filed: Sep. 26, 1991

[30] Foreign Application Priority Data

Sep. 27, 1990 [JP] Japan ................................ 2-258196

[51] Int. Cl.[5] ........................ H04H 1/02; H04B 7/185; H04B 1/18

[52] U.S. Cl. .................................... 455/6.2; 455/13.3; 455/282; 358/86; 342/362

[58] Field of Search ......................... 455/3, 4, 5, 6, 12, 455/13, 25, 80, 81, 82, 269, 270, 280, 281, 282, 313; 342/361, 362, 363, 364, 365, 366; 343/756, 765, 703, 786, 909, 700 MS; 358/84, 86; 380/10, 13

[56] References Cited

U.S. PATENT DOCUMENTS

| | | | |
|---|---|---|---|
| 4,538,175 | 8/1985 | Balbes et al. | 455/12 |
| 4,608,710 | 8/1986 | Suguira | 455/5 |
| 4,823,135 | 4/1989 | Hirashima et al. | 455/12 |
| 4,888,596 | 12/1989 | Cononan | 455/12 |
| 4,907,003 | 3/1990 | Marshall et al. | 455/12 |
| 5,023,935 | 6/1991 | Vancraeynest | 455/80 |
| 5,053,782 | 10/1991 | Levinberg et al. | 455/12 |

FOREIGN PATENT DOCUMENTS

| | | |
|---|---|---|
| 0149533 | 7/1985 | European Pat. Off. . |
| 0220867 | 5/1987 | European Pat. Off. . |
| 61-195094 | 6/1990 | Japan . |
| 226402 | 6/1990 | Japan . |
| 2107539 | 4/1983 | United Kingdom . |
| 2244616 | 4/1991 | United Kingdom . |

*Primary Examiner*—Reinhard J. Eisenzopf
*Assistant Examiner*—Lisa Charouel
*Attorney, Agent, or Firm*—Davis, Bujold & Streck

[57] ABSTRACT

A satellite signal receiving apparatus including a channel selector, an outdoor unit and a single transmission line connecting therebetween. The satellite signal receiving apparatus has such a simple structure that the installation work thereof is simple. In the satellite signal receiving apparatus, by superposing a pulse train over a source voltage supplied from the channel selector to the outdoor unit, the type of the polarized radiation signal to be output from the outdoor unit as transmission signal is switched. Since no change of the source voltage is required for switching the type of the polarized radiation signal, appropriate source voltage can be supplied to the outdoor unit. Furthermore, since no action against the heat released by a constant-voltage circuit is necessary, the type of the polarized radiation signal can be switched easily. Even if the source voltage varies with the length of the transmission line, the type of the polarized radiation signal can be switched effectively and stably.

22 Claims, 9 Drawing Sheets

OUTPUT FROM ASTABLE MULTIVIBRATOR 31

OUTPUT FROM MONOSTABLE MULTIVIBRATOR 32

OUTPUT FROM PULSE GENERATING CIRCUIT 30

SWITCH 29a

OUTPUT FROM PULSE TRAIN SUPERPOSING CIRCUIT 29

SATELLITE SIGNAL RECEIVING APPARATUS

BACKGROUND OF THE INVENTION

This invention relates to a satellite signal receiving apparatus that receives the vertically and horizontally polarized radiations sent from an artificial satellite.

Known communication satellites send out transmission radiation by alternately changing the plane of polarization of the transmission radiation for each adjacent channel, so that communication frequencies are effectively used. For example, JCSAT by Nihon Tsushin Eisel Co., Ltd., Super Bird by Uchu Tsusin Co., Ltd. and other communication satellites are available.

The satellite signal receiving apparatus for receiving radiation from such known communication satellites is disclosed in Laid-open Japan Patent Application No. 61-195094. The satellite signal receiving apparatus includes a receiving antenna located outdoors and provided with two converters and a switch. The two converters convert horizontally and vertically polarized radiation signals to the transmission signals having a specified frequency band, respectively. The switch selectively outputs either one of the transmission signals having the frequency converted by each converter. By controlling the switch at the side of the channel selecting unit located indoors, the desired polarized radiation signal is obtained at the side of the channel selecting unit.

In the aforementioned satellite signal receiving apparatus a signal line is provided for transmitting the switch driving signal from the channel selecting unit to the switch of the receiving antenna. A transmission line is also provided for coupling the receiving antenna and the channel selecting unit and for transmitting received signals. Therefore, when the satellite signal receiving apparatus is installed, the signal line and the transmission line have to be coupled separately. The installation work of the satellite signal receiving apparatus is thus complicated.

To solve such problem, the inventors of this invention developed the control over the switch without using the additional signal line for controlling the switch. Specifically, by providing a switch circuit at the channel selecting unit and a control circuit at the receiving antenna, the switch can be controlled without the signal line. The switch circuit switches the source voltage to be supplied to the receiving antenna into high or low source voltage, and the control circuit controls the switch according to the magnitude of the source voltage supplied from the channel selecting unit to the receiving antenna.

Generally in the satellite signal receiving apparatus, power source is supplied from the channel selecting unit to the receiving antenna via the transmission line for transmitting the received signals from the receiving antenna to the channel selecting unit. Therefore, when the plane of the polarization is switched and controlled by changing the magnitude of the source voltage, the receiving antenna and the channel selecting unit can be coupled only by the single transmission line. The installation work is thus simplified.

When the magnitude of the source voltage is changed, however, the constant-voltage circuit having input voltage with wide variations allowed is required for the receiving antenna, so that the converter can be operated with both the high and low source voltages. When the high source voltage is supplied to the receiving antenna, the input voltage to the constant-voltage circuit is dropped so much that the heat amount released from the constant-voltage circuit increases. Since raised temperature deteriorates the noise factor and other electric characteristics of the converter, the configuration of the converter has to be enlarged, or other actions against heat release are required.

Another problem is that the source voltage fed into the constant-voltage circuit decreases according to the length of the transmission line. The length of the transmission line varies with the position of the satellite signal receiving apparatus or other conditions. The greater the difference between the high and low source voltages is, the more precisely the difference between the source voltages can be determined regardless of the length of the transmission line, and the more precisely the switch can be switched and controlled. When the channel selecting unit outputs to the receiving antenna the high source voltage much higher than the low source voltage and the transmission line is short, however, the constant-voltage circuit has to receive extremely high source voltage. Consequently, when the polarized radiation signal is switched by changing the source voltage to be supplied to the receiving antenna, the size of the source voltage output from the channel selecting unit is difficult to set.

SUMMARY OF THE INVENTION

An object of this invention is to provide a satellite signal receiving apparatus that receives vertically and horizontally polarized radiation signals at the side of a receiving antenna and selectively outputs either one of the vertically and horizontally polarized radiation signals, in which polarized radiation signals are switched without being affected by released heat or other conditions and without using a separate signal line.

To solve these objects the present invention provides a satellite signal receiving apparatus comprising a outdoor unit and a channel selector. The outdoor portion comprises a receiving portion and a frequency converting circuit. The receiving portion receives vertically polarized radiation and horizontally polarized radiation, respectively, transmitted from an artificial satellite. The frequency converting circuit converts either one of the vertically polarized radiation and the horizontally polarized radiation output from the receiving portion into transmission signal having a specified frequency band, and outputs the transmission signal to a transmission line.

The channel selector comprises a tuning circuit and an operating portion. The channel selecting circuit is coupled via the transmission line to the outdoor unit. The tuning circuit extracts transmission signal having a specified frequency from transmission signals fed via the transmission line from the outdoor unit, and demodulates the transmission signal. The operating portion designates from the outside the frequency of the transmission signal to be demodulated by the tuning circuit.

The channel selecting portion further comprises a source voltage generating circuit, a polarized radiation signal designating portion, a pulse train superposing circuit, and a source voltage output circuit. The source voltage generating circuit generates source voltage to be supplied to the outdoor unit. The polarized radiation signal designating portion determines whether polarized radiation signal is to be vertically polarized radiation signal or horizontally polarized radiation signal.

The polarized radiation signal is converted in frequency by the frequency converting circuit and output to the transmission line. The pulse train superposing circuit superposes a specified pulse train over the source voltage according to the polarized radiation signal designated by the polarized radiation signal designating portion. The source voltage output circuit outputs source voltage passed through the pulse train superposing circuit to the transmission line.

The outdoor portion further comprises a source voltage extracting circuit, a smoothing circuit, a constant-voltage circuit, a pulse train detecting circuit, and a polarized radiation signal switch control circuit. The source voltage extracting circuit extracts source voltage from the transmission line. The smoothing circuit smooths the source voltage extracted by the source voltage extracting circuit. The constant-voltage circuit converts the source voltage smoothed by the smoothing circuit into specified voltage and supplies the specified voltage to each component of the outdoor portion. The pulse train detecting circuit detects a pulse train from the source voltage extracted by the source voltage extracting circuit. The polarized radiation signal switch control circuit switches the polarized radiation signal to be converted in frequency by the frequency converting circuit and outputs to the transmission line according to the detection by the pulse train detecting circuit.

In the channel selecting portion of the aforementioned satellite signal receiving apparatus, the source voltage is generated in the source voltage generating circuit. The pulse train superposing circuit superposes a pulse train over the source voltage according to the type of the polarized radiation signal designated by the polarized radiation signal designating portion. The polarized radiation signal designating portion designates the vertically polarized radiation signal or the horizontally polarized radiation signal. The source voltage output circuit supplies power source to the outdoor unit by outputting the source voltage passed through the pulse train superposing circuit to the transmission line for transmitting transmission signal.

The outdoor unit receives power source from the channel selector. In the outdoor unit, the source voltage extracting circuit extracts source voltage from the transmission line. The smoothing circuit smooths the source voltage extracted by the source voltage extracting circuit. The constant-voltage circuit converts the smoothed source voltage into specified voltage. The power source having constant voltage is supplied to the outdoor unit for driving each component therein. The pulse train detecting circuit detects the pulse train from the source voltage extracted by the source voltage extracting circuit. According to the result of the detection by the pulse train detecting circuit, the polarized radiation signal switch control circuit switches the polarized radiation signal. The polarized radiation signal is converted in frequency in the frequency converting circuit and output to the transmission line. The transmission signal is thus transmitted to the channel selector corresponding to the type of the polarized radiation signal designated by the polarized radiation signal designating portion.

Instead of switching the value of the source voltage to be supplied to the outdoor unit, the satellite signal receiving apparatus of this invention superposes the pulse train over the source voltage and switches the type of the polarized radiation signal provided by the outdoor unit.

DETAILED DESCRIPTION OF THE PREFERRED EMBODIMENT

Figure 2:
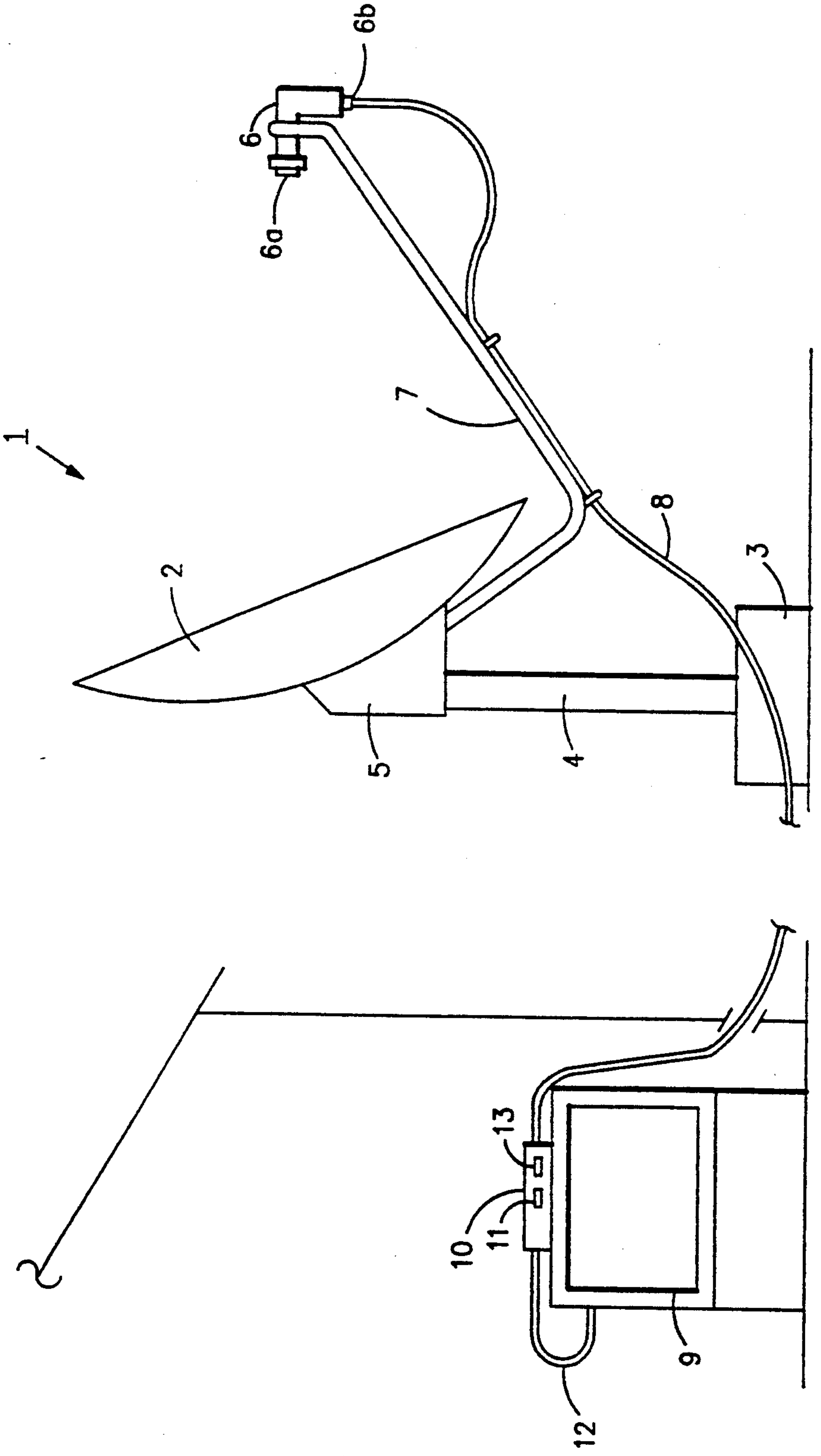
FIG. 2 is a schematic diagram showing the structure of the satellite signal receiving apparatus.

FIG. 2 shows a parabolic antenna 1 of offset type as a receiving antenna. A reflecting mirror 2 of the parabolic antenna 1 is attached via a support 5 to a post 4 set upright on a mount 3 for fixing the parabolic antenna 1 on the roof or on the ground. The elevation angle and the azimuth angle of the reflecting mirror 2 can be adjusted with the support 5. One end of a bracket 7 is coupled to the support 5 and the other end of the bracket 7 supports the outdoor unit 6 such that a radiation introducing portion 6*a* is positioned at the focus of the reflecting mirror 2. The outdoor unit 6 receives vertically polarized radiation and horizontally polarized radiation collected from a communication satellite by the reflecting mirror 2. On the other hand, the outdoor unit 6 is low noise blockdown converter (LNB), which converts either of the received vertically and horizontally polarized radiations into the transmission signal having a predetermined frequency band, for example 1 GHz band for output.

One end of a transmission line 8 of a coaxial cable is coupled to an output terminal 6*b* of the outdoor unit 6. The other end of the transmission line 8 is coupled to a channel selector 10 located adjacent to a television set 9 indoors. Therefore, the transmission signal is output from the outdoor unit 6 through the transmission line 8 into the channel selector 10. The channel selector 10 includes a channel selecting key 11 as an operating portion and is coupled via a connection line 12 to the television set 9. From the transmission signals from the outdoor unit 6, the channel selector 10 as the channel selecting portion extracts the transmission signal having the frequency corresponding to the frequency of the channel designated by the channel selecting key 11. The channel selector 10 then demodulates the extracted transmission signal. In this embodiment television signal is the transmission signal. The television signal demodulated by the channel selector 10 is fed via the connection line 12 into the television set 9. The channel selector 10 is also provided with a polarized radiation selecting key 13 for determining whether the transmission signal from the outdoor unit 6 is to be a vertically polarized radiation signal or a horizontally polarized radiation signal.

The channel selector 10 is now explained in detail with reference to FIG. 1A. The channel selector 10 has an input terminal 20 for coupling to the transmission line 8 and an output terminal 21 for coupling to the connection line 12. The transmission signal is fed from the outdoor unit 6 via the transmission line 8 and the input terminal 20 into the channel selector 10. The transmission signal is further fed through a source separation filter 22 into a tuning circuit 23 as a tuning circuit. In the tuning circuit 23 the television signal having the frequency corresponding to the frequency of the channel designated by the channel selecting key 11 is demodulated. The demodulated television signal is fed through the output terminal 21 and the connection line 12 into the television set 9.

Commercial electric power is introduced via an AC plug 24 into the channel selector 10. In the channel selector 10 the voltage of the introduced commercial electric power is dropped by a transformer 25. The commercial electric power with the dropped voltage is all rectified through a rectifier circuit 28 and is fed via a smoothing condenser 27 into a constant-voltage circuit 28. The constant-voltage circuit 28 as the source voltage generating circuit generates source voltage Vb necessary for supplying power to the inside circuits of the channel selector 10 and the outdoor unit 6. The source voltage Vb generated by the constant-voltage circuit 28 is supplied to the tuning circuit 23 and other pertinent components of the channel selector 10. At the same time, the source voltage Vb is transmitted via a pulse train superposing circuit 29, the source separation filter 22 and the input terminal 20 described later into the transmission line 8. The source separation filter 22 as a source voltage output circuit receives the transmission signal via the input terminal 20 from the outdoor unit 6 and feeds the transmission signal via a condenser C1 to the tuning circuit 23. At the same time, the source separation filter 22 receives the source voltage passed through the pulse train superposing circuit 29 and outputs the source voltage via a coil L1 to the input terminal 20.

The pulse train superposing circuit 29 includes a switch 29*a* which switches on or off in cooperation with the polarized radiation selecting key 13. As shown in FIG. 1A, when the switch 29*a* is off, on the condition that the horizontally polarized radiation signal is selected and designated by the polarized radiation selecting key 13, the source voltage Vb is output from the constant-voltage circuit 28 to the source separation filter 22 without being treated. Conversely, when the switch 29*a* is on, on the condition that the vertically polarized radiation signal is designated by the polarized radiation selecting key 13, the pulse train output from a pulse generating circuit 30 described later is superposed over the source voltage Vb output from the constant-voltage circuit 28. The source voltage Vb with the pulse train superposed thereover is thus output to the source separation filter 22. The aforementioned specified voltage is 7.5 V, the half of the Vb in this embodiment, and is, for example, selectively the two-thirds or less of Vb, at which a comparator 60 described later can identify the existence of pulse.

Figure 1A:
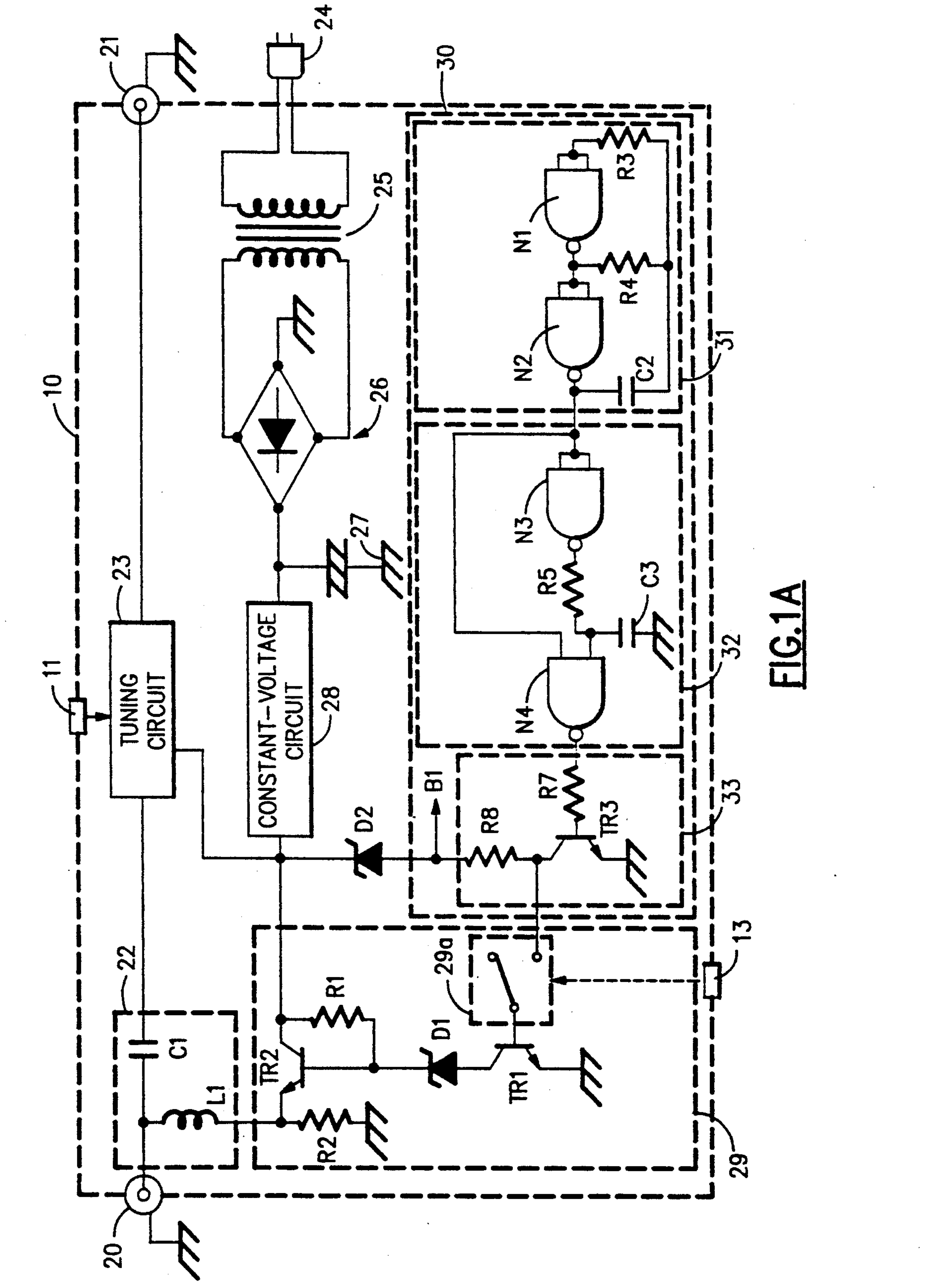
FIG. 1A is an electric circuit diagram showing a circuit structure of a receiver in a satellite signal receiving apparatus embodying the present invention.
Figures 3A, 3B, 3C, 3D, 3E:
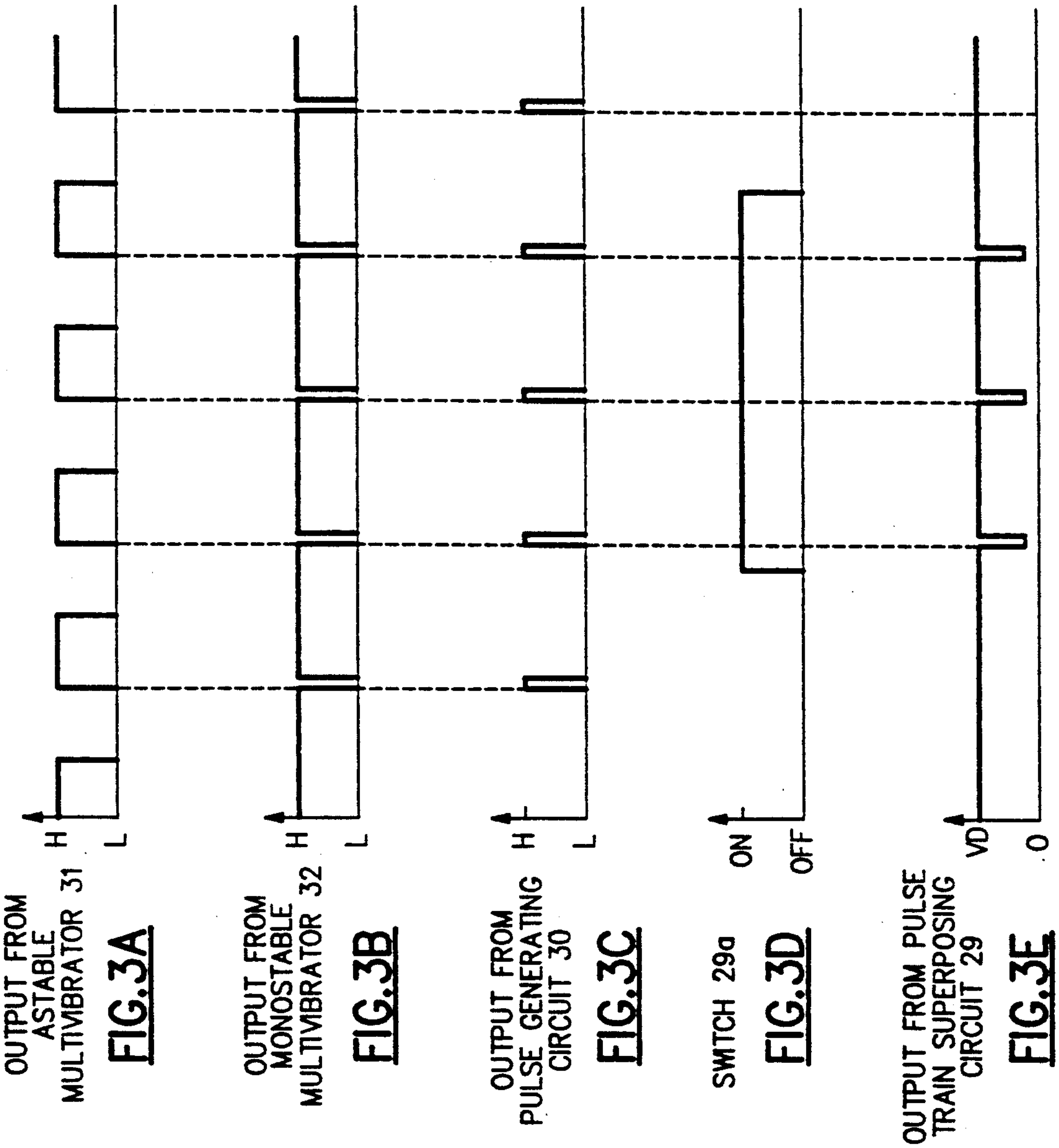
FIGS. 3A through 3K are time charts explaining the operation of the receiver and the outdoor unit.

As shown in FIG. 1A, the pulse train superposing circuit 30 also includes transistors TR1 and TR2. When the switch 29*a* is on, the transistor TR1 receives an output pulse from the pulse generating circuit 30 and turns on and off. The transistor TR2 is provided with resistors R1 and R2 for dropping the source voltage Vb down to the specified voltage determined by the breakdown voltage of a Zener diode D1 when the transistor TR1 is on. As shown in FIGS. 3C through 3E, when the switch 29*a* is off, the source voltage Vb from the constant-voltage circuit 28 is output to the source separation filter 22 without being treated. When the switch 29*a* is on, the output pulse from the pulse generating circuit 30 is superposed over the source voltage Vb. Specifically, the source voltage Vb is dropped down to the specified voltage by the output pulse, and is output to the source separation filter 22.

As shown in FIG. 1A, the pulse generating circuit 30 includes a known astable multivibrator 31, a known monostable multivibrator 32 and an inverting circuit 33. The astable multivibrator 31 includes NAND circuits N1, N2, resistors R3, R4, and a condenser C2. The monostable multivibrator 32 includes NAND circuits N3, N4, a resistor R5, and a condenser C3. The inverting circuit 33 includes resistors R7, R8 and a transistor TR3. As shown in FIG. 3A, the astable multivibrator 31 generates the pulse signal having the predetermined frequency of, for example, between 20 kHz and 30 kHz. As shown in FIG. 3B, the monostable multivibrator 32 generates the pulse signal remaining at a low level for a predetermined time period, 3 to 5$\mu$ sec. in this embodiment, from the leading edge of the output pulse from the astable multivibrator 31. As shown in FIG. 3C, the inverting circuit 33 generates the pulse signal such that the output pulse from the monostable multivibrator 32 is inverted and is superposed over the source voltage Vb. The pulse generating circuit 30 acts upon receiving source supply +B1 via a Zener diode D2 from the constant-voltage circuit 28.

The outdoor unit 6 is now explained in detail with reference to FIG. 1B. The vertically and horizontally polarized radiations are collected from the communication satellite to the radiation introducing portion 6*a*, and are further introduced through a cylindrical waveguide 40 to probes 41 and 42 as the receiving portion for receiving the radiation at each plane of polarization. The output signals from the probes 41 and 42 are composed of the vertically and horizontally polarized radiation signals. The output signals are fed into a vertically polarized radiation signal amplifier circuit 43 and a horizontally polarized radiation signal amplifier circuit 44, respectively, which are composed of a known low noise amplifier circuit composed of a high electron mobility transistor. The high electron mobility transistor acts by receiving positive and negative source voltages. According to the positive source voltage supplied from a polarized radiation signal switch control circuit 45 described later, either one of the vertically and horizontally polarized radiation signal amplifier circuits 43 and 44 is selectively driven.

Figure 1B:
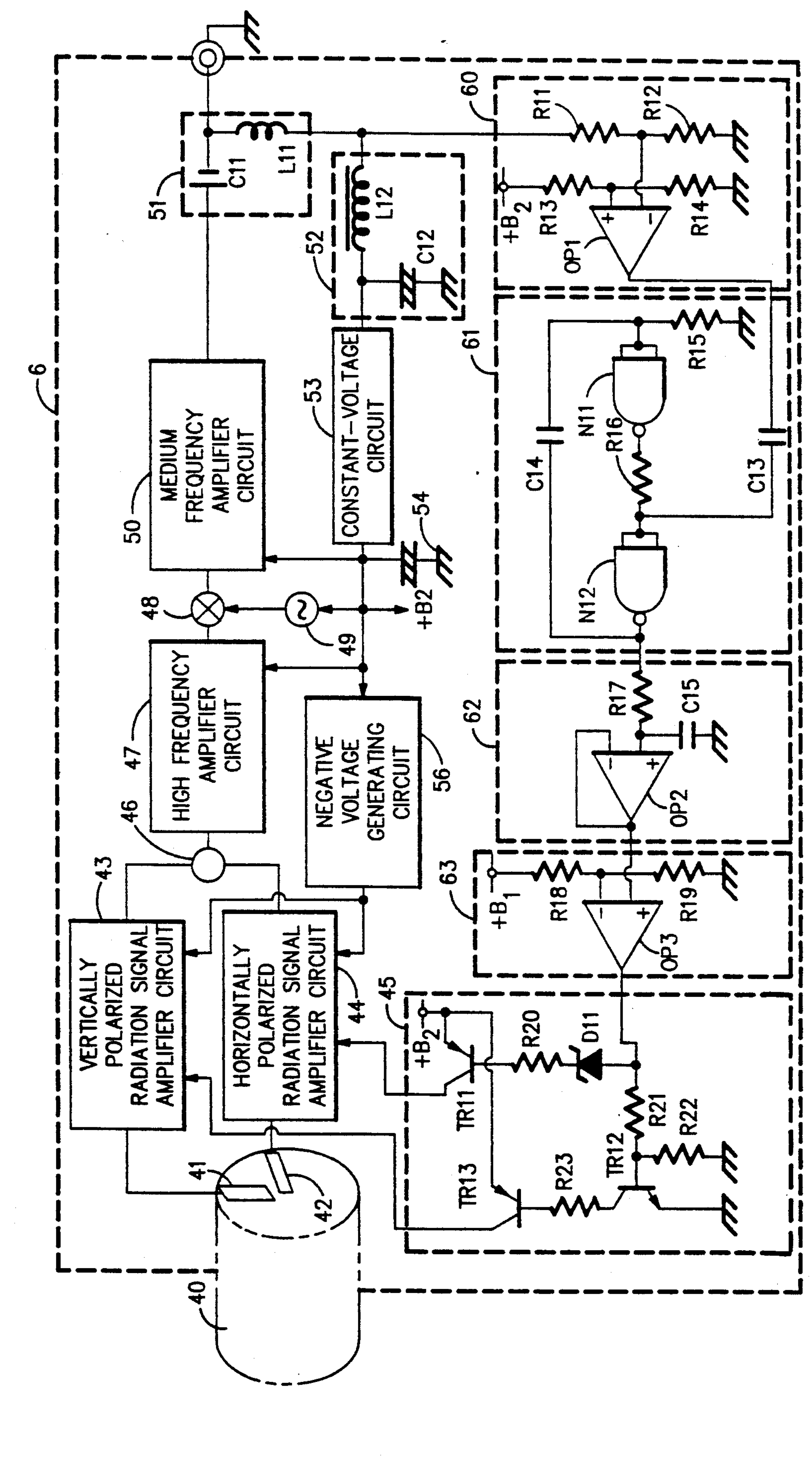
FIG. 1B is an electric circuit diagram showing a circuit structure of an outdoor unit in the satellite signal receiving apparatus.

As shown in FIG. 1B, the output signals output from the vertically and horizontally polarized radiation signal amplifier circuits 43 and 44 are fed via a mixer circuit 46 into a high frequency amplifier circuit 47, and are further amplified therethrough. Subsequently, the amplified output signals are mixed with the output signal output from a local oscillator circuit 49 by a mixer circuit 48, and are converted into the transmission signal having a predetermined frequency band, for example, 1 GHz band. The transmission signal is amplified by a medium frequency amplifier circuit 50, and is output via a source separation filter 51 and the output terminal 6*b* to the transmission line 8. In this embodiment, the vertically polarized radiation signal amplifier circuit 43, the horizontally polarized radiation signal amplifier circuit 44, the mixer circuit 46, the high frequency amplifier circuit 47, the mixer circuit 48, the local oscillator 49 and the medium frequency amplifier circuit 50 compose a frequency converting circuit.

As shown in FIG. 1B, the source separation filter 51 composes the source voltage extracting circuit, and outputs the transmission signal via a condenser C11 toward the output terminal 6b. At the same time the source separation filter 51 extracts via a coil L11 the source voltage fed via the output terminal 6b from the channel selector 10. The extracted source voltage is smoothed in a smoothing circuit 52 composed of a condenser C12 and a coil L12. The source voltage is fed into a constant-voltage circuit 53, is converted to the specified voltage, 10 V in this embodiment. The specified voltage is optional between 5 V and 10 V, which is suitable for activating the high frequency amplifier circuit 47, the medium frequency amplifier circuit 50 and a negative voltage generating circuit 56 described later. Subsequently, the specified voltage is further smoothed by a smoothing condenser 54 to form a source voltage +B2 for driving the outdoor unit 6. In the embodiment the source voltage extracted by the source separation filter 51 is first smoothed by the smoothing circuit 52 and is then fed into the constant-voltage circuit 53. As aforementioned, in the embodiment the pulse train is superposed over the source voltage supplied from the side of the channel selector 10 as desired. If the source voltage with the pulse train superposed thereover is directly fed into the constant-voltage circuit 53, the constant-voltage circuit 53 outputs unstable output voltage. If the source voltage with the pulse train superposed thereover is smoothed beforehand by the smoothing circuit 52, the source voltage is added to the comparator 60 without being affected by the constant-voltage circuit 53. The outdoor unit 6 is also provided with the negative voltage generating circuit 56, which generates negative source voltage for driving the vertically and horizontally polarized radiation signal amplifier circuits 43 and 44. Therefore, the negative source voltage generated by the negative voltage generating circuit 56 is constantly supplied to the vertically and horizontally polarized radiation signal amplifier circuits 43 and 44.

Figures 3F, 3G, 3H, 3I, 3J, 3K:
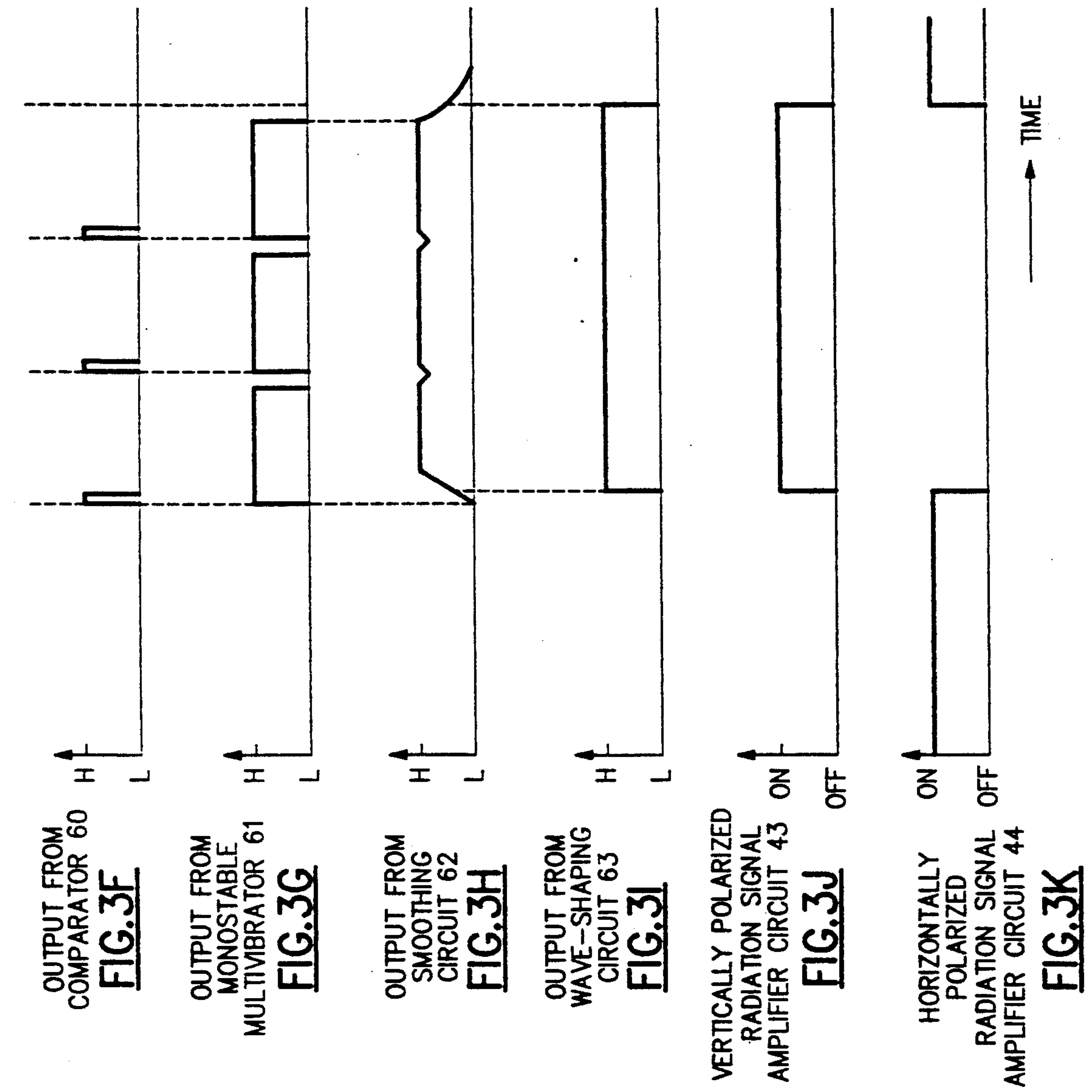

As shown in FIG. 1B, the comparator 60 includes resistors R11 through R14 and an operational amplifier OP1. As shown in FIG. 3F, the comparator 60 outputs the signal of high level when the source voltage has the specified value or less, 8 V in this embodiment. The specified value is set greater than the half of Vb and less than Vb. The source voltage extracted by the source separation filter 51 is fed into the comparator 60. The output signal output from the comparator 60 is fed into a known monostable multivibrator 61. As shown in FIG. 1B, the monostable multivibrator 61 includes resistors R15, R16, condensers C13, C14 and NAND circuits N11, N12. As shown in FIG. 3G, the pulse signal generated by the monostable multivibrator 61 stays at high level for a specified time period from the leading edge of the output signal output from the comparator 60. The specified time period is shorter than the time period obtained by subtracting the pulse width of the pulse generating circuit 30 from the period of the astable multivibrator 31. When the oscillating frequency of the astable multivibrator 31 is 20kHz, its period is 50μ sec. When the pulse width of the pulse generating circuit 30 is 3μ sec., the specified time period may be shorter than 50μ sec. minus 3μ sec., 47μ sec. In this embodiment the specified time period is 40μ sec.

The output signal output from the monostable multivibrator 61 is fed into a smoothing circuit 62. The smoothing circuit 62 is composed of an integral circuit and a voltage follower. As shown in FIG. 1B, the integral circuit includes a resistor R17 and a condenser C15, and the voltage follower includes an operational amplifier OP2. The output signal is smoothed in the integral circuit, and is output via the voltage follower. As shown in FIG. 3H, the smoothed output signal is output from the smoothing circuit 62, and is fed into a wave-shaping circuit 63. As shown in FIG. 1B, the wave-shaping circuit 63 includes resistors R18, R19 and an operational amplifier OP3. As shown in FIGS. 3H and 3I, when the output signal output from the smoothing circuit 62 has a specified level or more, the output signal from the wave-shaping circuit 63 has high level. The specified level is 8 V in this embodiment, and may be set greater than the half of Vb and less than Vb. After being shaped, the output signal is fed from the wave-shaping circuit 63 into the polarized radiation signal switch control circuit 45.

As shown in FIG. 1B, the polarized radiation signal switch control circuit 45 includes resistors R20 through R23, Zener diode D11, and transistors TR11 through TR13. As shown in FIGS. 3I and 3J, when the output signal from the wave-shaping circuit 63 has high level, the polarized radiation signal switch control circuit 45 supplies the source voltage +B2 generated by the constant-voltage circuit 53 as a positive source voltage to the vertically polarized radiation signal amplifier circuit 43. As shown in FIGS. 3I and 3K, when the output signal from the wave-shaping circuit 63 has low level, the polarized radiation signal switch control circuit 45 supplies the source voltage +B2 generated by the constant-voltage circuit 53 as a positive source voltage to the horizontally polarized radiation signal amplifier circuit 44.

When, as shown in FIG. 3D, the switch 29a of the channel selector 10 is on, the polarized radiation selecting key 13 selects and designates the vertically polarized radiation signal. As shown in FIG. 3I, the output signal of high level is transmitted from the wave-shaping circuit 63 through the comparator 60, the monostable multivibrator 61 and the smoothing circuit 62. As shown in FIGS. 3J and 3K, the positive source voltage is supplied only to the vertically polarized radiation signal amplifier circuit 43. Thus, as shown in FIG. 3J, the vertically polarized radiation signal amplifier circuit 43 is operated so that the outdoor unit 6 outputs the transmission signal of the vertically polarized radiation.

Conversely, when, as shown in FIG. 3D, the switch 29a of the channel selector 10 is off, the polarized radiation selecting key 13 selects and designates the horizontally polarized radiation signal. As shown in FIG. 3I, the output signal of low level is transmitted from the wave-shaping circuit 63 through the comparator 60, the monostable multivibrator 61 and the smoothing circuit 62. As shown in FIGS. 3J and 3K, the positive source voltage is supplied only to the horizontally polarized radiation signal amplifier circuit 44. Thus, as shown in FIG. 3K, the horizontally polarized radiation signal amplifier circuit 44 is operated so that the outdoor unit 6 outputs the transmission signal of the horizontally polarized radiation.

As aforementioned, in the satellite signal receiving apparatus of this embodiment, when the switch 29a is on and the polarized radiation selecting key 13 selects and designates the vertically polarized radiation signal, the channel selector 10 supplies to the outdoor unit 6 the source voltage Vb generated by the constant-voltage circuit 28 with the pulse train superposed thereover. Conversely, when the switch 29*a* is off and the polarized radiation selecting key 13 selects and designates the horizontally polarized radiation signal, the source voltage generated by the constant-voltage circuit 28 is supplied to the outdoor unit 6 without being treated. When the supplied source voltage has the superposed pulse train, the vertically polarized radiation signal amplifier circuit 43 is operated at the side of the outdoor unit 6. When the supplied source voltage has no pulse train, the horizontally polarized radiation signal amplifier circuit 44 is operated.

In this embodiment, the outdoor unit 6 can switch the polarized radiation signal to be converted to the transmission signal for output without using a separate signal line for switching the polarized radiation signal. Therefore, no separate signal line is required, thus simplifying the installation work of the satellite signal receiving apparatus. Furthermore, in this embodiment, since no change of source voltage is required for switching the polarized radiation signal, appropriate source voltage can be constantly supplied to the outdoor unit 6. Consequently, no problem is caused by the transmission line 8, such as the heat release from the constant-voltage circuits 28 and 53, although only the transmission line 8 switches the polarized radiation signal. In addition, in the embodiment, although the source voltage varies according to the length of the transmission line 8, the polarized radiation signal can be switched effectively and stably.

In the embodiment so as to output the transmission signal of the vertically polarized radiation from the outdoor unit 6, the pulse train is superposed over the source voltage supplied from the channel selector 10 to the outdoor unit 6. So as to output the transmission signal of the horizontally polarized radiation from the outdoor unit 6, no pulse train is superposed over the source voltage. Regardless of the transmission signal output from the outdoor unit 6, the pulse train may be superposed over the source voltage. By changing the frequency, the width and other characteristics of the pulse train superposed on the source voltage, the polarized radiation signal to be converted to the transmission signal for output by the outdoor unit 6 may be switched.

Figure 4:
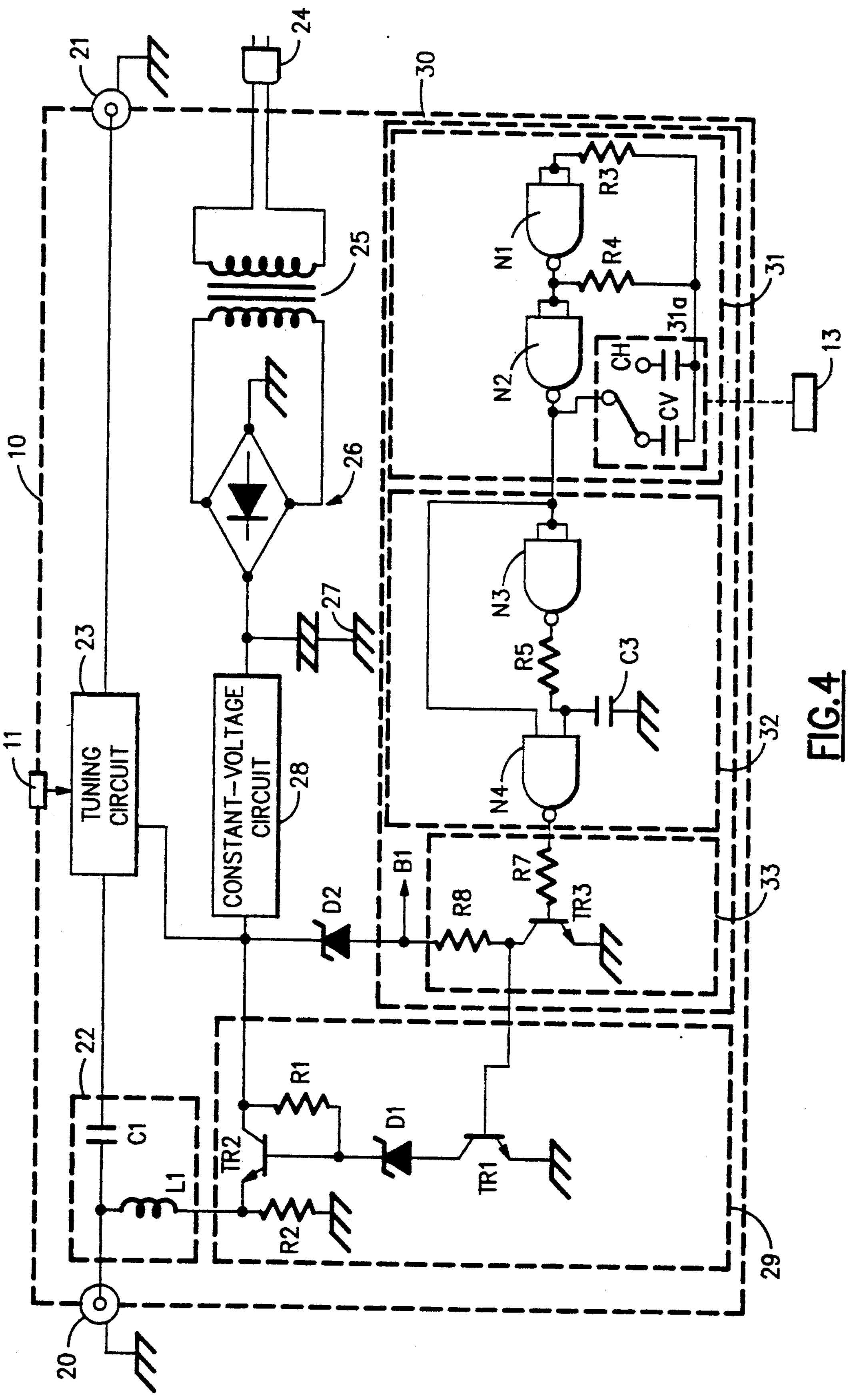
FIG. 4 is an electric circuit diagram showing the modification of the circuit structure shown in FIG. 1A.

The modification of the circuit structure in FIG. 1A is shown in FIG. 4, which is the circuit for control by changing the period, and in which by removing the switch 29*a* from the pulse train superposing circuit 29, the pulse train superposing circuit 29 is always connected to the inverting circuit 33. A switch 31*a* cooperating with the polarized radiation selecting key 13 is added to the astable multivibrator 31. In the switch 31*a* condensers $C_V$ and $C_H$ are switched, and the condensers $C_V$ and $C_H$ have the relationship of $C_V < C_H$ in the capacitance.

Figure 5:
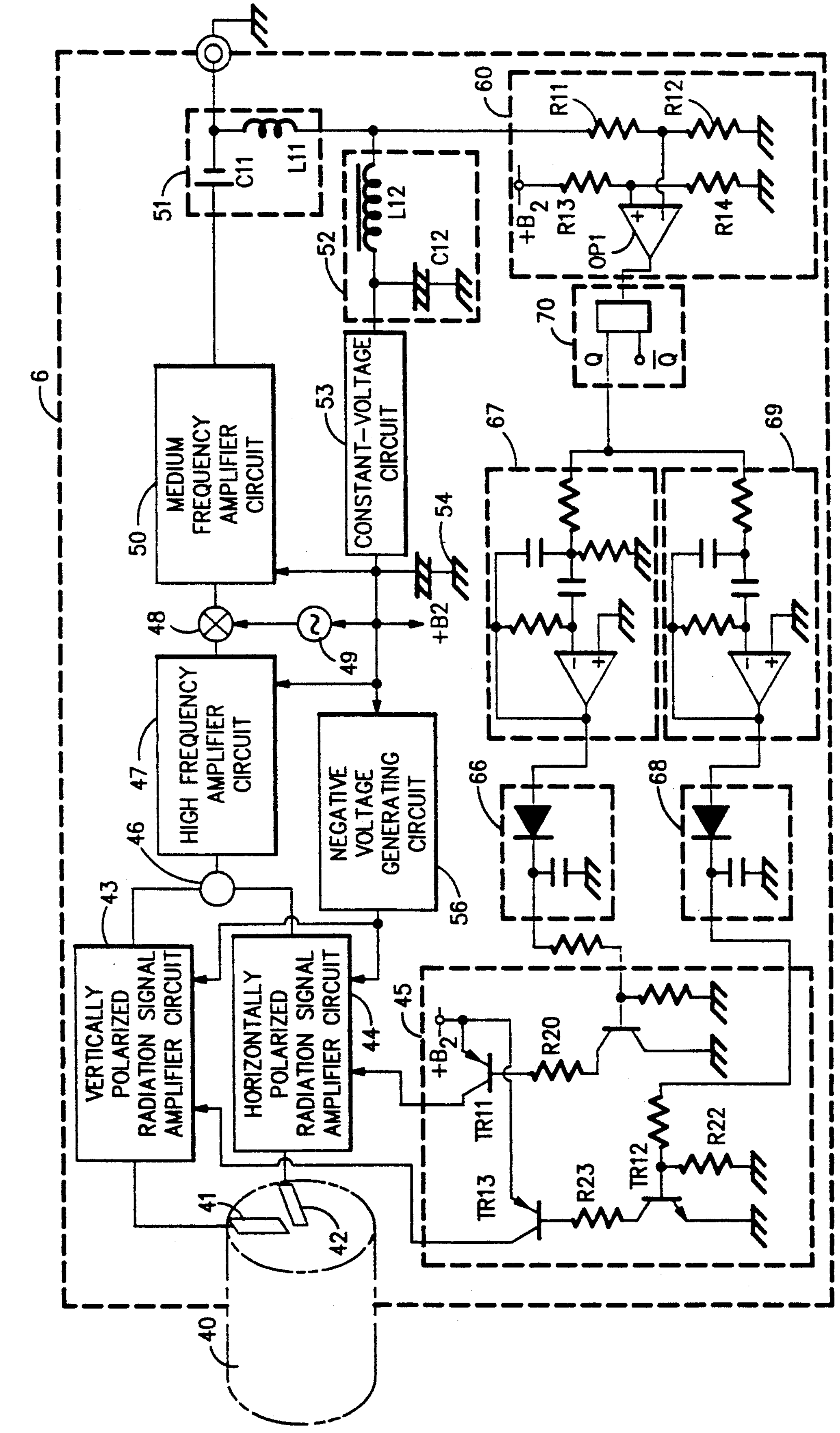
FIG. 5 is an electric circuit diagram showing the modification of the circuit structure shown in FIG. 1B.

The modification of the circuit structure of FIG. 1B is shown in FIG. 5, which is the circuit for control by changing the period, and in which the monostable multivibrator 61, the smoothing circuit 62 and the wave-shaping circuit 63 are removed. Instead, the polarized radiation signal switch control circuit 45 and the comparator 60 are connected via wave detecting circuits 66, 68, active filters 67, 69 and a T-flip-flop circuit 70. When the oscillating frequency of the active filters 69 and 67 are $f_V$ and $f_H$, respectively, the relationship $f_V > f_H$ results. These frequencies $f_V$ and $f_H$ correspond to the oscillating frequency of the astable multivibrator 31 in FIG. 4.

Figure 6:
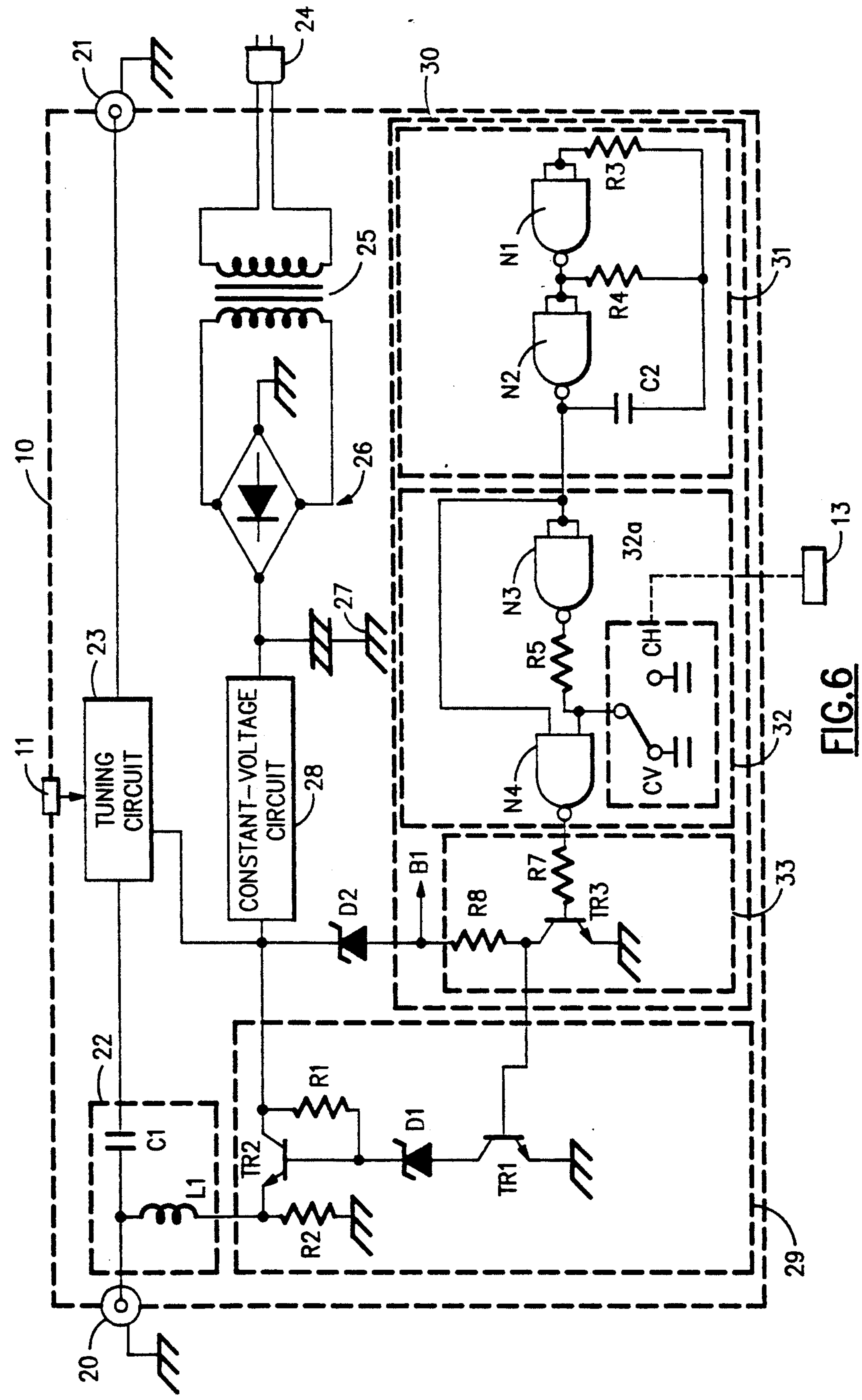
FIG. 6 is an electric circuit diagram showing another modification of the circuit structure shown in FIG. 1A.

Another modification of the circuit structure in FIG. 1A is shown in FIG. 6, which is the circuit for control by changing the pulse width, and in which by removing the switch 29*a* from the pulse train superposing circuit 29, the pulse train superposing circuit 29 is always turned on. A switch 32*a* cooperating with the polarized radiation selecting key 13 is added to the monostable multivibrator 32. In the switch 32*a* condensers $C_V$ and $C_H$ are switched.

Figure 7:
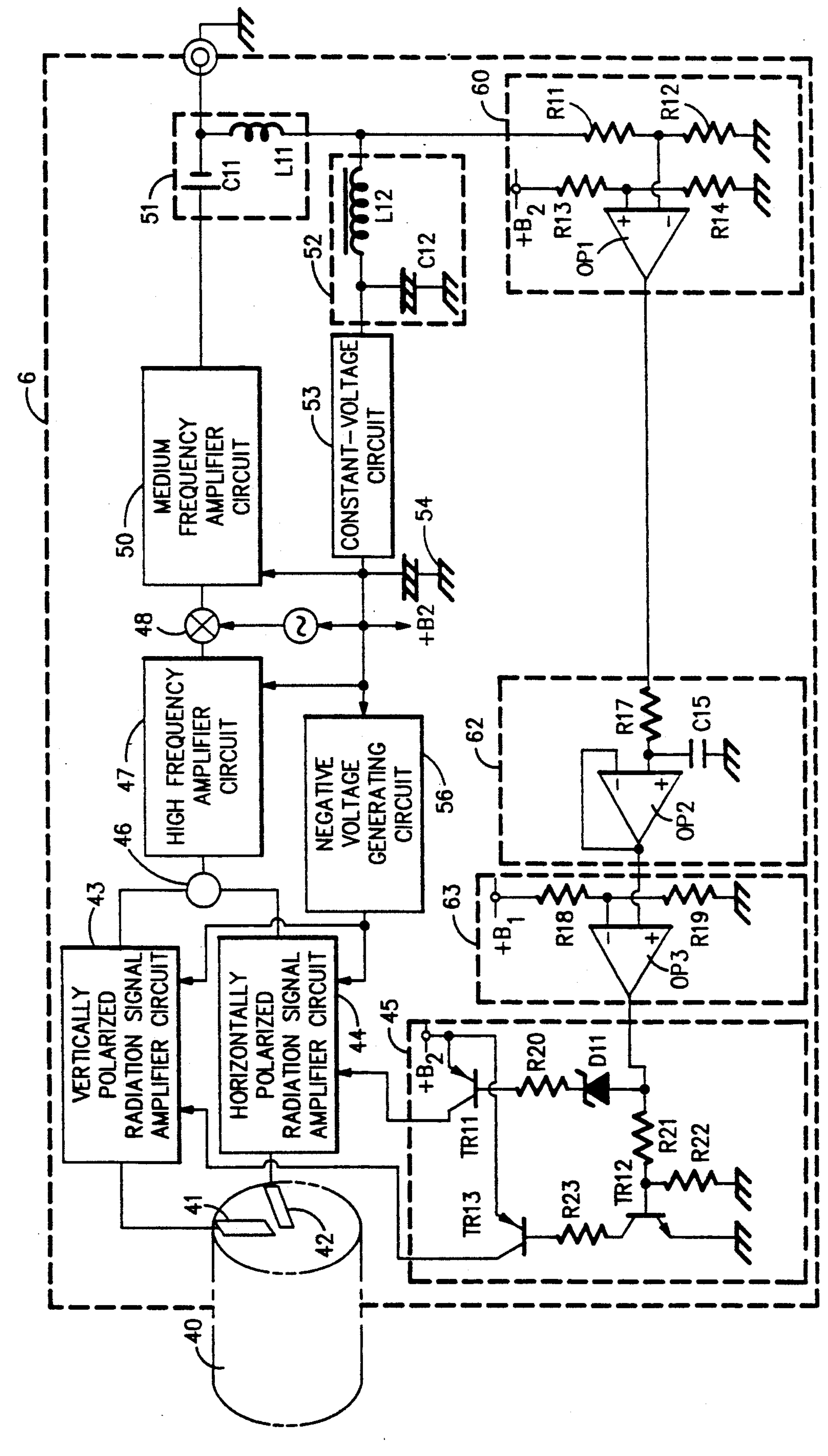
FIG. 7 is an electric circuit diagram showing another modification of the circuit structure shown in FIG. 1B.

Another modification of the circuit structure of FIG. 1B is shown in FIG. 7, which is the circuit for control by changing the pulse width, and in which the monostable multivibrator 61 is removed. Therefore, the output of the comparator 60 is connected to the input of the smoothing circuit 62. By selecting the capacitance of the condenser C15 and the resistance of the resistor R17, the output voltage differs according to the difference in the input pulse width. The wave-shaping circuit 63 identifies the difference of the output from the smoothing circuit 62 for the input to the polarized radiation signal switch control circuit 45.

In the embodiment by using the output pulse from the pulse generating circuit and dropping the source voltage down to the specified voltage, the pulse train is superposed over the source voltage. By using the output pulse from the pulse generating circuit and raising the source voltage up to the specified voltage, the pulse train may be superposed over the source voltage. By using the output pulse from the pulse generating circuit and dropping the source voltage down to OV, the pulse train may be superposed over the source voltage.

In the embodiment, the switch 29*a* is turned on or off by the polarized radiation selecting key 13. Since the plane of the polarization of the radiation corresponding to the channel selected by the tuning circuit 23 is known, the switch 29*a* may be actuated in cooperation with the channel selecting key 11 or the tuning circuit 23.

The present invention is not limited to the embodiment described above but includes all embodiments and modifications within the scope and spirit of the invention

What is claimed is:

1. A satellite signal receiving apparatus comprising an outdoor unit, a channel selector and a transmission line connecting therebetween, wherein said outdoor unit comprises:

a receiving means for receiving vertically polarized radiation and horizontally polarized radiation, respectively, transmitted from an artificial satellite;

a frequency converting means for converting either one of said vertically polarized radiation and said horizontally polarized radiation output from said receiving means into transmission signal having a predetermined frequency band and outputting said transmission signal to said transmission line;

a source voltage extracting means for extracting a source voltage superposed over a pulse train by said channel selector and received therefrom via said transmission line;

a smoothing means for smoothing said source voltage extracted by said source voltage extracting means;

a constant-voltage means for converting said source voltage smoothed by said smoothing means into a predetermined voltage and for supplying said predetermined voltage to each component of said outdoor unit;

a pulse train detecting means for detecting a pulse train from said source voltage extracted by said source voltage extracting means to generate a detection signal; and a polarized radiation signal switch control means for switching said vertically and horizontally polarized radiation signals to be converted in frequency by said frequency converting means and output to said transmission line in accordance with said detection signal generated by said pulse train detecting means.

2. A satellite signal receiving apparatus according to claim 1, wherein said frequency converting means further comprises horizontally polarized radiation signal amplifier means and vertically polarized radiation signal amplifier means, each amplifier means including a high electron mobility transistor each of which is selectively driven in accordance with a source voltage supplied from said polarized radiation signal switch control means.

3. A satellite signal receiving apparatus according to claim 2, wherein said polarized radiation signal switch control means includes at least one resistor, a Zener diode and at least one transistor, and selectively supplies a source voltage generated by said constant-voltage means to said vertically polarized radiation signal amplifier means and said horizontally polarized radiation signal amplifier means on the basis of said detection signal from said pulse train detecting means.

4. A satellite signal receiving apparatus according to claim 1, wherein said frequency converting means further comprises a medium frequency amplifier means which amplifies said transmission signal, and output via said source voltage extracting means and an output terminal means to said one transmission line.

5. A satellite signal receiving apparatus according to claim 1, wherein said source voltage extracting means includes a condenser which outputs said transmission signal via an output terminal means to said one transmission line.

6. A satellite signal receiving apparatus according to claim 1, wherein said source voltage extracting means includes a coil which extracts said source voltage fed via an output terminal from said channel selector.

7. A satellite signal receiving apparatus according to claim 1, wherein said smoothing means includes a condenser and a coil which smoothes said extracted source voltage, to generate a source voltage for driving said outdoor unit.

8. A satellite signal receiving apparatus according to claim 1, wherein said source voltage extracting means extracts said source voltage and outputs to said pulse train detecting means which includes resistors and an operational amplifier and outputs said detection signal in accordance with a level of said source voltage.

9. A satellite signal receiving apparatus comprising an outdoor unit, a channel selector and one transmission line connecting therebetween, wherein said channel selector comprises:

a tuning means coupled via said one transmission line to said outdoor unit for extracting a transmission signal having a predetermined frequency from said transmission signal fed via said one transmission line from said outdoor unit and demodulating said extracted transmission signal;

an operating means for designating said frequency of said transmission signal to be demodulated by said tuning means;

a source voltage generating means for generating source voltage to be supplied to said outdoor unit via said one transmission line;

a polarized radiation signal designating means for determining whether a polarized radiation signal is to be a vertically polarized radiation signal or a horizontally polarized radiation signal, said polarized radiation signal being converted in frequency by a frequency converting means;

a pulse train superposing means for superposing a predetermined pulse train over said source voltage according to said polarized radiation signal designated by said polarized radiation signal designating means; and a source voltage output means for outputting said source voltage passed through said pulse train superposing means to said one transmission line, said outdoor unit receiving and extracting said source voltage and detecting said pulse train which switches said polarized radiation signal.

10. A satellite signal receiving apparatus according to claim 9, wherein said source voltage output means receives said source voltage passed through said pulse train superposing means and outputs said source voltage via a coil to an input terminal means.

11. A satellite signal receiving apparatus according to claim 9, wherein source voltage output means receives said transmission signal via an input terminal means from said outdoor unit and feed said transmission signal via a condenser to said tuning means.

12. A satellite signal receiving apparatus according to claim 9, wherein said pulse train superposing means includes a switch which switches between a first status and a second status in response to said polarized radiation signal designating means.

13. A satellite signal receiving apparatus according to claim 9, wherein said pulse train superposing, means includes means for changing width of said pulse train superposed on said source voltage.

14. A satellite signal receiving apparatus according to claim 9, wherein said pulse train superposing means includes means for changing frequency of said pulse train superposed on said source voltage.

15. A satellite signal receiving apparatus according to claim 9, wherein said polarized radiation signal is polarized in one of a horizontal and vertical plane, and wherein said plane of said polarized radiation signal corresponds to said channel selected by said tuning means, and wherein said pulse train superposing means includes a switch which is actuated in response to at least one of said channel signal designating means and said tuning means.

16. A satellite signal receiving apparatus according to claim 12, wherein, said switch is in said first status, on condition that said horizontally polarized radiation signal is designated by said polarized radiation signal designating means, and said source voltage is output from said source voltage generating means to said source voltage output means without being treated by said pulse train superposing means.

17. A satellite signal receiving apparatus according to claim 12, wherein, when said switch is in said second status on condition that said vertically polarized radiation signal is designated by said polarized radiation signal designating means, said pulse train superposing means superposes said pulse train output from a pulse generating means over said source voltage output from said source voltage generating means, said source voltage with said pulse train superposed thereover is output to said source voltage output means.

18. A satellite signal receiving apparatus according to claim 12, wherein, said pulse train superposing means includes at least one transistor, said at least one transistor receiving said pulse train from said pulse train superposing means and selectively turns from a first status to a second status when said switch is in said second status, said at least one transistor being provided with at least one resistor for dropping said source voltage down to a predetermined voltage determined by a breakdown voltage of a Zener diode when said at least one transistor is in said second status.

19. A satellite signal receiving apparatus according to claim 12, wherein when said switch is in said second status, said pulse train superposing means superposes said predetermined pulse train from said pulse train superposing means over said source voltage, and changes said source voltage to a predetermined voltage by said pulse train, and outputs said predetermined voltage to said source voltage output means.

20. A satellite signal receiving apparatus according to claim 12, wherein said switch is in said second status on condition that said polarized radiation signal designating means selects said vertically polarized radiation signal, said channel selector supplies to said outdoor means said source voltage generated by said source voltage generating means with said predetermined pulse train superposed thereover.

21. A satellite signal receiving apparatus according to claim 12, wherein said switch is in said first status and said polarized radiation signal designating means selects said horizontally polarized radiation signal, said channel selector supplies to said outdoor unit said source voltage generated by said source voltage generating means without being treated by said pulse train superposing means.

22. A satellite signal receiving apparatus comprising: an outdoor unit including;

a receiving means for receiving vertically polarized radiation and horizontally polarized radiation, respectively, transmitted from an artificial satellite, and a frequency converting means for converting either one of said vertically polarized radiation and said horizontally polarized radiation output from said receiving means into a transmission signal having a predetermined frequency band and outputting said transmission signal to a transmission line;

a channel selecting means including:

a tuning means coupled via said transmission line to said outdoor unit for extracting said transmission signal having a predetermined frequency from said transmission signal fed via said transmission line from said outdoor unit and demodulating said extracted transmission signal, an operating means for designating said predetermined frequency of said transmission signal to be demodulated by said tuning means, wherein said channel selecting means further includes;

a source voltage generating means for generating a source voltage to be supplied to said outdoor unit via said transmission line, a polarized radiation signal designating means for determining whether a polarized radiation signal is to be said vertically polarized radiation or said horizontally polarized radiation, said polarized radiation signal being converted in frequency by said frequency converting means, a pulse train superposing means for superposing a predetermined pulse train over said source voltage according to said polarized radiation signal designated by said polarized radiation signal designating means, and a source voltage output means for outputting said source voltage passed through said pulse train superposing means to said transmission line, said outdoor unit further includes:

a source voltage extracting means for extracting said source voltage passed through said pulse train superposing means and received from said transmission line, a smoothing means for smoothing said source voltage extracted by said source voltage extracting means, a constant-voltage means for converting said source voltage smoothed by said smoothing means into a predetermined voltage and for supplying said predetermined voltage to each component of said outdoor unit, a pulse train detecting means for detecting a pulse train from said source voltage extracted by said source voltage extracting means, and a polarized radiation signal switch control means for switching said polarized radiation signal to be converted in frequency by said frequency converting means and output to said transmission line in accordance with said detecting by said pulse train detecting means.

* * * * *